United States Patent Office 3,200,999
Patented Aug. 17, 1965

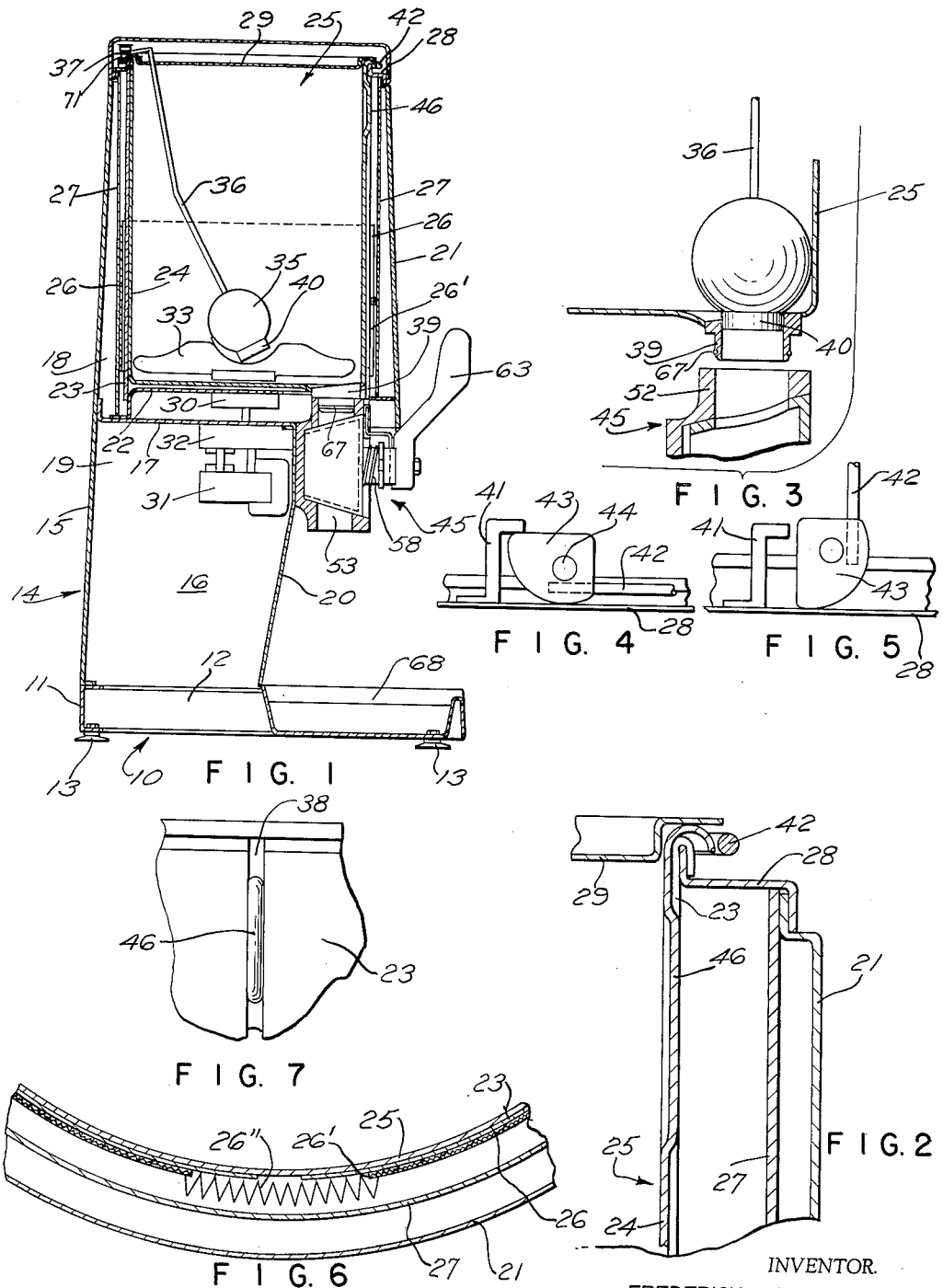

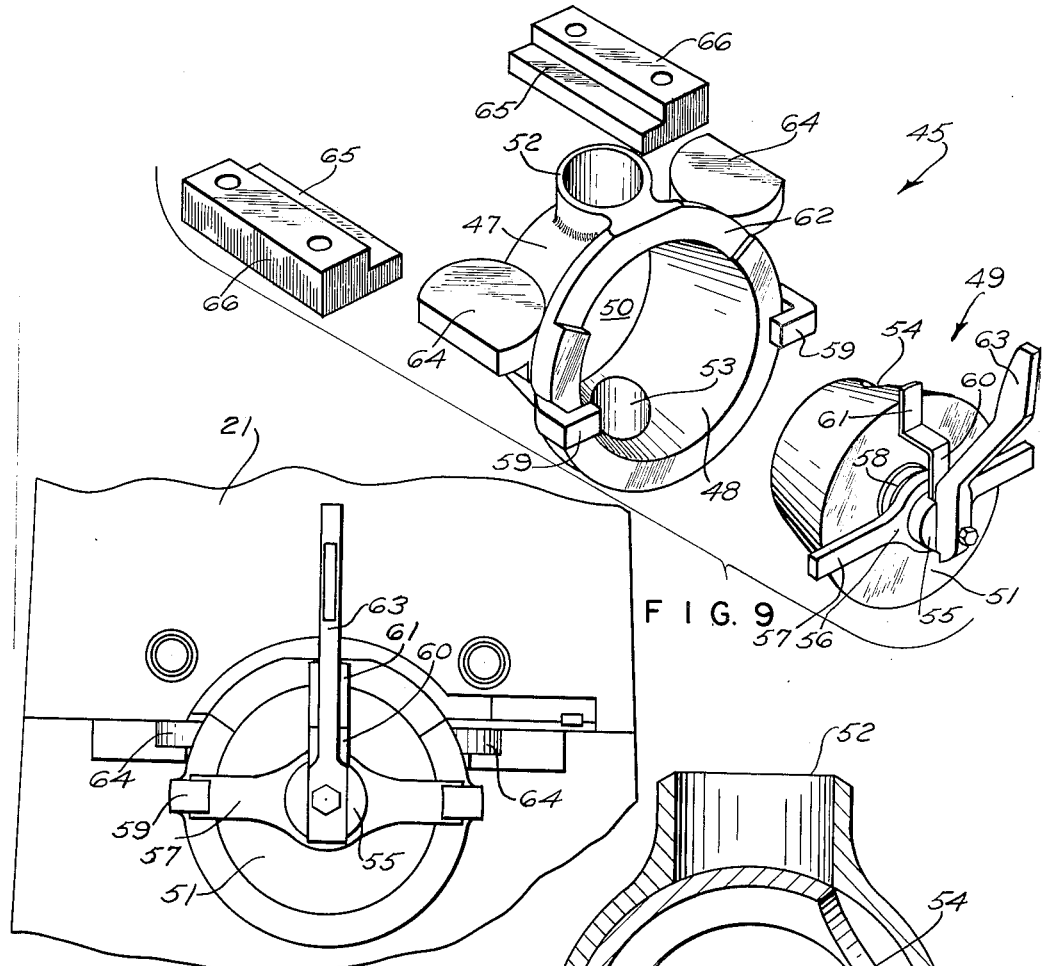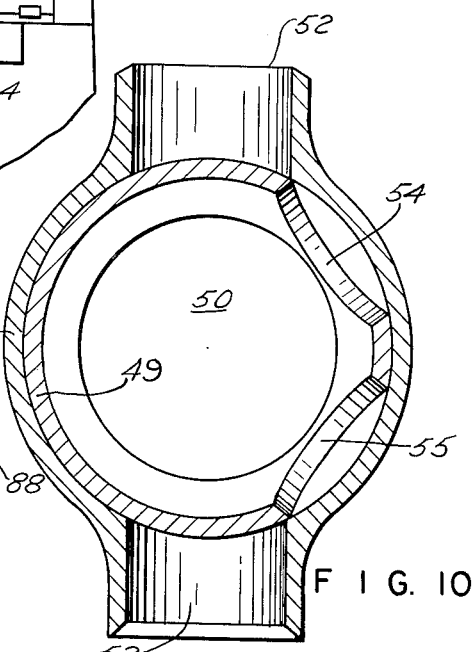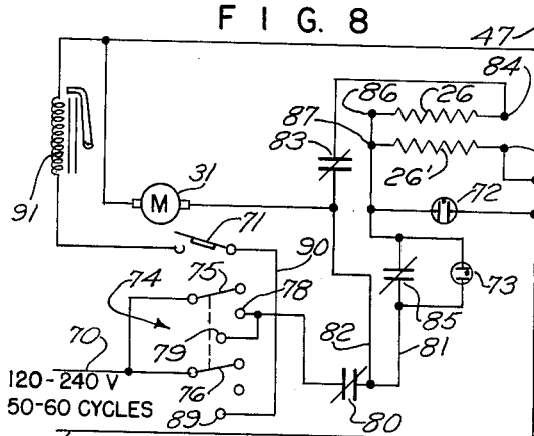

3,200,999
LIQUID FOOD DISPENSING DEVICE
Frederick J. Price, Jr., Saugus, Mass., assignor to
Doryce Appleton, Stuart, Fla.
Filed Sept. 27, 1962, Ser. No. 226,521
8 Claims. (Cl. 222—185)

This invention relates to a device for dispensing liquid food, such as soup and the like.

In the preparation and handling of foods, it is essential that provision be made for cleaning the apparatus which is used. Any element of the apparatus contacted by the food must be accessible for cleaning.

One of the objects of this invention is to provide a portable unit in which food may be cooked and dispensed with each part contacted by the food removable from the structure so that the same may be washed, scoured and cleaned in a sink or at some location separated from the unit itself.

Another object of the invention is to provide a seal for a removable bowl so that liquid may be maintained therein while the bowl is being removed from the unit.

Another object of the invention is to permit the bowl to be placed in the unit only when properly oriented so that its discharge is aligned with the discharge mechanism of the unit.

Another object of the invention is to mechanically force the bowl to and from its operating position.

Another object of the invention is to provide a removable food trap which will be locked in position by the assembly of the bowl in the unit.

Another object of the invention is to provide a food trap which will be easily sealed as assembled after cleaning.

Another object of the invention is to provide a device which may be loaded with dry, dehydrated or condensed foods and water or milk and thereafter started and then automatically controlled to cook the food and maintain it at a serving temperature indefinitely.

More specifically, an object of the invention is to load the device with dry, dehydrated or condensed food in measured quantities and a measured quantity of water and then to push a button which will cause heat to be applied until the food is cooked by bringing the same to a boil and thereafter lowering the heat below this cooking range and maintaining the heat at the temperature at which it is desired that the food should be served, all automatically.

Another object of this invention is to provide an indicating means which will notify an attendant when the cooking cycle has been completed and the food is ready to be served and will notify the attendant that the food is at the temperature which it is desired should be maintained for serving during the time that this food remains at this temperature.

With these and other objects in view, the invention consists of certain novel features of construction as will be more fully described and particularly pointed out in the appended claims.

In the accompanying drawings:

FIG. 1 is a sectional view illustrating the dispensing apparatus as a whole;

FIG. 2 is a sectional view of a fragmental portion at the upper righthand corner of the view shown in FIG. 1;

FIG. 3 is a fragmental sectional detail illustrating the plugging of the dispensing opening of the removable bowl;

FIG. 4 is a detail elevation of a cam for removing the bowl with the cam in one position;

FIG. 5 is similar to FIG. 4 illustrating the cam in a different position;

FIG. 6 is a sectional view taken through the heating band and illustrating the same contracted about the jacket;

FIG. 7 is a fragmental view showing the projection on the bowl entering a groove in its jacket to align the bowl;

FIG. 8 is an elevation showing a fragmental portion of the unit and illustrating particularly the dispensing trap;

FIG. 9 is an exploded view of the dispensing trap and its mounting;

FIG. 10 is a sectional view through the dispensing trap showing the openings in the rotor; and FIG. 11 is a schematic diagram of the wiring of the heat controls.

With reference to the drawings, a base designated generally 10 is formed by a U-shape channel member having a back part 11 and sides 12 supported by feet 13 arranged at the corners of a rectangle. From this base there rises a sheet metal casing 14 having a back wall 15 and sides 16 which extend forwardly therefrom and rise to a height sufficient to house the operating content of the dispenser. A deck member 17 separates this casing into an upper chamber 18 and a lower chamber 19. The upper chamber protrudes out beyond the lower chamber, and each is closed by individual separate front walls, that for the upper chamber being designated 21 and for the lower chamber 20.

Spaced from this deck member or separator 17 there is a false bottom member 22 from which there rises fixed bowl jacket 23 with its ends spaced as seen in FIG. 6 which has tight thermal contact with the sides 24 of the bowl 25 which is supported by these members. Surrounding and contacting this jacket 23 and in heat transfer relation therewith there are two heating elements 26, 26' arranged in a broad band and drawn snugly about the jacket by a spring 26'' which are energized electrically, while outside of and spaced from these heating elements there is a heat shield 27 extending the full length of the jacket. This heat shield is also spaced from the housing casing 14 and its vertically extending walls 15, 16 and 21. A suitable closure 28 (see FIG. 2) extends from the jacket out to the casing so as to house the heat shield within the casing. The bowl is closed by a removable cover 29.

A magnetic actuator 30 is located in the space between the false bottom 22 and the deck member or separator 17. This actuator is driven by an electric motor 31 through gearing in the housing 32. An agitator 33 is removably located within the bowl 25 and is coupled to the magnetic actuator 30 by a suitable magnet so that when the motor rotates the actuator 30, the agitator also will turn to stir the contents of the bowl 25.

A float 35 on stem 36 rocks a member 37 which has a mercury switch 71 connected thereto and will maintain the switch open when there is sufficient liquid in the bowl to raise the float and incline the mercury switch. However, when the liquid is below a predetermined level, the mercury switch will close. A discharge stem 39 is located at one portion of the bottom wall of the bowl 25. The float 35 is equipped with a projecting portion 40 which will fit into the opening of the discharge stem 39 so as to prevent the flow of liquid food therethrough and permits of the removal of the bowl without complete discharge of its liquid content. This bowl 25 is equipped with a handle 42 which is pivoted by means of cam members 43 as at 44 at the upper edge of the bowl. When the handle 42 is lifted from its stored position as shown in FIG. 4 to its position as shown in FIG. 5 for lifting the bowl out of position, the cam members 43 bearing upon the closure plate 28 serve to pry the bowl from its working position, thus lifting the stem 39 from the measuring trap designated generally 45 for more easily lifting the bowl from position. A strike 41 is also located adjacent the position of the cams 43 so that as the handle 42 is swung to its stored position, the cams will engage the hook portion of this strike and force the bowl downwardlly to working position. In order that the bowl may register with the dispensing trap, I have provided a protuberance 46 on the bowl which will enter a groove 38 in the jacket at only one location so as to bring the stem 39 into the correct position relative to the dispensing trap 45.

The deck member or separator 17 and also the false bottom are cut away in the area with which the stem 39 registers so as to receive therein the trap 45 shown exploded in FIG. 9.

This dispensing trap 45 has a body 47 which is generally circular but tapered from its front to rear providing a frusto-conical inner surface 48 on a 15° taper. This 15° taper is of importance because it provides a non-sticking taper for the rotor portion 49, which is hollow having a wall with an outer surface also on the same taper. These tapered surfaces are machined to have a close fit. The body 47 provides a back wall 50 against which the open end of the rotor member engages, while the rotor member has a front wall 51 which will be substantially flush with the front end of the body 47 and provide a closure for the body. Extending upwardly from the top of the body 47 there is the intake port 52 of the trap, while at a point substantially diametrically opposite this intake port, there is a discharge port 53 through the body. The rotor has an inlet port 54 and a discharge port 55 (see FIG. 10) located in angular relation depending upon the rotation desired. In this case the angular relation is substantially 90° between the two ports. The rotor has a stem 55 extending from its end wall 51 while there is a bar 56 having an opening to receive this stem and with wing portions 57 extending in either side thereof. A spring 58 is located between the end wall 51 and the bar so that, when the rotor is placed into the body and the bar 56 is moved below the overhanging lips 59 on either side of the body which are fixed to the body and in one piece therewith, the spring will force the rotor into the tapered inner surface of the body so as to provide a sealing contact between the parts. An offset arm 60 fixed with relation to the rotor has the portion 61 received in a recess 62 of the end face of the body so as to limit the rotation of the rotor with reference to the body. A handle 63 fixed to the rotor serves to provide a means for manually turning the rotor from one position to another.

The trap body is also equipped with wings 64 on either side thereof which enable it to slide along the surfaces 65 provided by the L-shape bracket 66 which are secured on the underside of the deck member or separator 17, one on each side of the cut away portion above referred to. These wings 64 are of such dimension that the trap 45 may be slid into position, and when fully back against some abutment such as the wall 20, the correct location is provided for the insertion of the stem of the bowl into the inlet take 52. An O-ring 67 in this stem (see FIG. 3) provides a seal with the inner surface of the inlet port 52, and the bowl stem serves to lock the trap in position by reason of the stem entering this inlet port. Thus the bowl must be removed or lifted from its seated position in the inlet take 52 in order that the dispensing trap 45 may be removed.

For operation of the dispensing trap, the rotor 49 is positioned so that the opening 54 and opening 52 are aligned. At this location the wall of the rotor closes off the discharge opening 53, and liquid including half-inch cubes of solid food may pass through these openings 52 and 54 into the trap which will be the size of the measured quantity of liquid food to be dispensed. Air which is contained within the trap will bubble up through the dispensing opening 52 serving to assist in maintaining agitation in the bowl. After a few seconds have elapsed and the trap is filled with liquid food, the handle will be turned through substantially 90° so as to seal off the entrance opening 52 from opening 54 but locate the dispensing or discharge opening 55 of the rotor in registry with the discharge opening 53 of the body so that the contents of the food may pass from the trap into some container located on the support 68 (FIG. 1) which also may serve as a drip tray and be removably positioned on the arms 12 of the base.

Assuming that the bowl is removed from the unit and the trap is removed and disassembled, after cleaning, the trap will first be assembled and slid into position along the guides 65. The bowl will then be slid into the jacket with the protuberance 46 entering the slot 38 so that the stem 39 as it moves into its lowered position will enter the opening 52 of the trap. Then by swinging the handle to its stored position, the cam 43 will engage the lips on striker 41 so as to move the bowl into its seated position with the O-ring 67 sealing in the opening 52 of the trap. The agitator 33 will then be placed in the bowl, and the float 35 and its stem hooked into position. The device is now ready to receive the contents for cooking, and the dehydrated food will be placed in the bowl together with sufficient amount of water to provide the correct mixture. In some cases this may be put into the bowl prior to placing the bowl in the unit by using the float 35 to plug the opening in the stem. The device is now ready to be heated which is accomplished by energizing the heating band 26 and 26' which comprise electrical resistance heating coils for this purpose.

Suitable controls are provided for the heating as illustrated in the electric circuit as shown in FIG. 11 in which the two heating coils 26 and 26' are shown as coupled to some source of current at 70 which may be the usual 120 or 240 volt 50 to 60 cycle source. A lamp is provided in the circuit so that when the switches are turned on, the lamp will show a glow indicating heating is taking place. The high heating coil is actuated initially and will be actuated until the food is brought to a boil which after a predetermined interval will actuate a thermostat to cut back the circuit to maintain a lower degree of heating of the bowl. At this time there will also be a change in the indicating lights so a light will show that the cooking has been performed and the food is ready to serve. This lower heating range will prevent the burning of the food and still keep the food in a hot condition at about 170° which is desirable for serving. This temperature will be maintained plus or minus 5° while food is left in the container for the device to function. When the food is beyond a predetermined low limit in the bowl, normally open switch 71 will close sounding either an alarm or actuating other safety devices well known in the art.

To understand how the foregoing operates, reference is now made to FIG. 11 for a schematic diagram of one suitable method of accomplishing the above. A double pole three-position switch is provided with one pole 75 serving basically to energize the heating elements 26, 26', while the other pole 76 thereof serves basically to energize a low level indicating or safety circuit. Contacts 78 and 79 associated with pole 75 commonly lead to a safety switch 80 which may be a thermostatic type of breaker or other high current type cutoff device which is normally closed. From the other side of this safety device 80, the circuit makes two branches 81 and 82, the branch 82 leading through a hold thermostat 83 to terminal 84 of the heat holding coil 26. The other branch 81 leads through a cooking control thermostat 85 and thence to terminal 86 of heat holding coil 26 and terminal 87 of cooking coil 26'. The other terminal 88 of cooking coil 26' is then connected back to the other side of the source of current as at 70'. Stirring motor 31 is connected across the line on the load side of safety switch 80 between branches 82 and the other side of the line at 70'. The low level indicating circuit is connected to the line 70 through pole 76 and contact 89. For example, there is shown the mercury switch 71 having one side connected to this contact 89 over line 90, while the other side of the mercury switch 71 is shown as connected to an alarm device 91 in the form of a buzzer, the other side of which has its return to line 70'.

It will be apparent that the switch 74 may be rotated from its position as shown in the schematic diagram to two positions. The first position will energize only the heating coils, while the second position where the poles 75 and 76 make contact respectively with contacts 79 and 89 will energize both the low level indicating circuit and the heating coils. In normal operation the switch will be in this latter position, and in this position, assuming that soup has just been placed in the container, a circuit across the current flow will be established only through the cooking coil 26'. This comes about since both the holding thermostat and the cooking thermostat 83 and 85 respectively are closed, and across the holding heating coil 26 a voltage of equal polarity will be established, thus preventing any current flow. During this cooking process since a voltage drop will be established across the cooking coil 26', indicator lamp 72, which is a glow discharge device, will be lit. As soon as the cooking process has been completed, cooking thermostat 85 will open. At this time the holding thermostat 83 will also have opened since its operating range is lower in terms of temperature than the cooking thermostat 85. At this time their voltage drop will appear across thermostat 85 causing the glow discharge indicator lamp 73 to fire which will convey to the user the information that the soup is ready to be served. This voltage drop will be sufficient to fire the lamp since the resistance of coil 26' will have virtually no effect on a glow discharge device. Also when the thermostat 85 opens, lamp 72 will extinguish since no voltage drop appears across the heating coil 26'. Whenever the soup drops below the holding temperature which is approximately in the range of 175° and within the limitation of actuation of thermostat 83, this thermostat will close, thus connecting one side of the line 70 to terminal 84 of coil 26, while the other side of the line 70' appears at terminal 86 through heating coil 26'. The relative resistance between the heating coils 26 and 26' is such that coil 26' has a much lower ohmic resistance than does coil 26. Accordingly, the presence of coil 26' in the circuit does not impede the current flow to coil 26, since it merely acts as a low resistance in series therewith. As soon as soup has again reached the proper holding temperature, thermostat 83 will open and the cycle may thus repeat.

The serial connection of the coils 26 and 26' give rise to a novel heating and holding circuit which lends itself very well to the use of a simple indicator device in the form of glow discharge devices that make use of the fact that voltage drops appear across certain elements thereof. This arrangement thus simplifies the circuitry with the use of two heating elements, one used for cooking and producing a high heat output, namely, coil 26' together with a low voltage or holding element indicator by coil 26. This eliminates the need of external relays in actuating devices and other complications which have heretofore arisen in the control art.

I claim:

1. A food trap having a casing with a back wall and sides having an internal taper increasing in diameter as it progresses from said back wall and providing an open front, a hollow rotor with a front wall closing said open front and having sides with an external taper corresponding to the said internal taper, a stud extending from said front wall, overhanging lips on said casing, a bar mounted on said stud having wings to removably extend beneath said lips and a spring between said bar and front wall to urge said rotor into said casing.

2. In an apparatus for dispensing a liquid food, a chamber, a supporting deck within said chamber, a removable food trap having an upwardly facing receiving opening, a bowl for containing food of a size to enter said chamber and having a discharge stud from the bottom thereof entering said opening, a striker on said chamber and a cam pivotally mounted on said bowl to swing relative to said bowl and engage said striker and force the bowl downwardly and said stud into said opening to lock the food trap in place.

3. In an apparatus for dispensing a liquid food, a chamber, a supporting deck within said chamber, a removable food trap having an upwardly facing receiving opening, a bowl for containing food of a size to enter said chamber and having a discharge stud from the bottom thereof entering said opening to lock the trap in place, a cam pivotally mounted on said bowl positioned to engage a part fixed on said chamber for lifting said bowl relative to said chamber and withdrawing said stud from said opening to release said food trap.

4. In an apparatus for the dispensing of liquid food, a supporting member having an opening therethrough and an abutment in fixed relation to said member, a food trap horizontally slidably mounted below said member and having an upwardly facing receiving opening registering with the opening in the member when engaging said abutment, a bowl above said member for containing liquid food provided with a downwardly extending discharge stem entering said openings and locking with said food trap.

5. In an apparatus as in claim 4 wherein said deck is provided with a slideway beneath it and said trap has outwardly extending wings slidable in said slideway.

6. In an apparatus as in claim 4 wherein said stud has an O-ring to provide a seal between said stem and the wall of said opening.

7. In an apparatus for dispensing a liquid food, a chamber having vertical side walls and an open top, a supporting member within said chamber, a food trap having an upwardly facing receiving opening and supported by said member, a bowl generally symmetrical with respect to its center axis for containing food and of a size to enter said chamber through said open top and having a discharge stud from the bottom thereof eccentrically located with reference to the center axis of the bowl, and interfitting means between said bowl and side walls to align said stud with said trap receiving opening as the bowl is positioned into said chamber through said open top.

8. In an apparatus as in claim 7 wherein said means comprises a groove in said side walls and a projection on said bowl to enter said groove and maintain the bowl oriented with respect to said food trap opening.

References Cited by the Examiner

UNITED STATES PATENTS

| | | | |
|---|---|---|---|
| 418,223 | 12/89 | Puffer | 222—185 |
| 1,369,754 | 2/21 | Nixon | 220—57 |
| 1,997,416 | 4/35 | Grover. | |
| 2,028,838 | 1/36 | Kermin | 222—185 |
| 2,559,877 | 7/51 | Ihle et al. | 222—146 XR |
| 2,615,596 | 10/52 | Blue | 222—164 |
| 2,775,375 | 12/56 | Haller | 222—362 |
| 2,853,208 | 9/58 | Paulding | 222—76 |
| 3,096,913 | 7/63 | Corley | 222—183 |

FOREIGN PATENTS

| | | |
|---|---|---|
| 188,817 | 11/22 | Great Britain. |
| 534,273 | 9/31 | Germany. |

EVERETT W. KIRBY, *Primary Examiner.*

LOUIS J. DEMBO, *Examiner.*